US012651923B1

(12) United States Patent

O'Neal et al.

(10) Patent No.: US 12,651,923 B1
(45) Date of Patent: Jun. 9, 2026

(54) EMERGENCY HOME POWER DELIVERY

(71) Applicant: United Service Automobile Association (USAA), San Antonio, TX (US)

(72) Inventors: Nickolaus Wayne O'Neal, Adkins, TX (US); Brian Tougas, Spring Branch, TX (US); Gideon Bowie Luck, Plano, TX (US); Nathan Lee Post, Rockport, TX (US); Daniel Scott Veibell, Wylie, TX (US); Edward Manuel Alonzo, III, San Antonio, TX (US); Sean Carl Mitchem, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 256 days.

(21) Appl. No.: 18/457,971

(22) Filed: Aug. 29, 2023

(51) Int. Cl.

| | |
|---|---|
| *H02J 3/06* | (2026.01) |
| *H02J 3/466* | (2026.01) |
| *H02J 9/06* | (2006.01) |
| *H02J 13/12* | (2026.01) |
| *H02J 13/13* | (2026.01) |
| *H02J 13/00* | (2026.01) |
| *H02J 101/20* | (2026.01) |
| *H02J 101/30* | (2026.01) |
| *H02J 103/35* | (2026.01) |
| *H02J 105/12* | (2026.01) |

(52) U.S. Cl.
CPC ............... *H02J 9/062* (2013.01); *H02J 3/06* (2013.01); *H02J 3/466* (2020.01); *H02J 13/12* (2026.01); *H02J 13/1333* (2026.01); *H02J*

*2101/20* (2026.01); *H02J 2101/30* (2026.01); *H02J 2103/35* (2026.01); *H02J 2105/12* (2026.01)

(58) Field of Classification Search
CPC .... H02J 9/062; H02J 3/06; H02J 3/466; H02J 13/00002; H02J 13/00024; H02J 2203/10; H02J 2300/20; H02J 2300/30; H02J 2310/12
USPC ......................................................... 700/286
See application file for complete search history.

(56) References Cited

U.S. PATENT DOCUMENTS

| | | | | |
|---|---|---|---|---|
| 12,038,726 | B2 * | 7/2024 | Holmes | B60L 53/67 |
| 2006/0219448 | A1 * | 10/2006 | Grieve | B60L 50/50 320/109 |
| 2012/0016546 | A1 * | 1/2012 | Nilssen | B60L 53/50 180/65.265 |

* cited by examiner

*Primary Examiner* — Michael J Brown
(74) *Attorney, Agent, or Firm* — Fletcher Yoder, P.C.

(57) ABSTRACT

Systems and methods are provided for using a home power delivery (HPD) system to provide power delivery service to locations experiencing power outages. The HPD system detects a power outage in an area and broadcasts a request for power delivery service to vehicles, which provide power delivery service to the area by using a generator or a rechargeable battery carried by the vehicles, by a green energy (e.g., solar energy, wind energy) system equipped or carried on the vehicles, and the like. the HPD system also provides a resources exchange platform to allow resources to be exchanged among the neighborhood to allow for a distribution of the available resources across residents.

20 Claims, 4 Drawing Sheets

EMERGENCY HOME POWER DELIVERY

BACKGROUND

The present disclosure is related to providing home power delivery services. More specifically, the present disclosure is related to delivering power to homes via vehicles.

Power outages oftentimes result in unexpected issues. In many cases, alternative power resources or power recovery options may not be efficiently distributed. As electrical technology becomes more dynamic, new power delivery services may be developed to provide flexible power distribution.

Moreover, resources in different homes of a community may not experience the same outage. For example, some homes in a community may experience a power outage while other homes may have power available. In addition, homes in a community may experience outages of different resources. For example, some homes may experience an electricity outage but may have gas, while other homes may experience an outage of gas but may have electricity. Accordingly, resources exchange platform may be used in a community to help resources exchanging among the neighborhood to expedite the distribution of the resources.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a plurality of sensors and a computing system, which comprises a processor. The processor is configured to receive a plurality of utility service profiles associated a plurality of homes in an area, and the plurality of utility service profiles comprises information associated with a plurality of utility services available at the plurality of homes. The processor is also configured to identify a first group of the plurality of homes based on sensor data received from the plurality of sensors, and each of the first group of the plurality of homes has an outage of at least a first utility of the plurality of utility services during a period of time. The processor is also configured to identify a second group of the plurality of homes based on the sensor data, and each of the second group of the plurality of homes has at least a second utility of the plurality of utility services available during the period of time, where the first utility is different from the second utility. The processor is also configured to send a notification to a computing device associated with a first home of the second group, and the notification comprises a request to provide the second utility. The processor is also configured to receive an acceptance from the computing device, and the acceptance comprises location data associated with the first home. The processor is also configured to send an indication of the second utility being available to an additional computing device associated with a second home of the first group of the plurality of homes. The processor is also configured to receive an additional acceptance to receive the second utility from the additional computing device, and, in response to receiving the additional acceptance from the additional computing device, send access data for accessing the second utility to the additional computing device.

In one embodiment, a method may include receiving, via one or more processors, a plurality of utility service profiles associated a plurality of homes in an area, and the plurality of utility service profiles comprises information associated with a plurality of utility services available at the plurality of homes. The method may also include identifying, via the one or more processors, a first group of the plurality of homes based on sensor data received from a plurality of sensors, and each of the first group of the plurality of homes has an outage of at least a first utility of the plurality of utility services during a period of time. The method may also include identifying, via the one or more processors, a second group of the plurality of homes based on the sensor data, and each of the second group of the plurality of homes has at least a second utility of the plurality of utility services available during the period of time, and the first utility is different from the second utility. The method may also include sending, via the one or more processors, a notification to a computing device associated with a first home of the second group, and the notification comprises a request to provide the second utility. The method may also include receiving, via the one or more processors, an acceptance from the computing device, and the acceptance comprises location data associated with the first home. The method may also include sending, via the one or more processors, an indication of the second utility being available to an additional computing device associated with a second home of the first group of the plurality of homes. The method may also include receiving, via the one or more processors, an additional acceptance to receive the second utility from the additional computing device, and, in response to receiving the additional acceptance from the additional computing device, sending, via the one or more processors, access data for accessing the second utility to the additional computing device.

In one embodiment, a non-transitory, computer readable medium may include instructions for a processor to perform operations. The operations may include receiving a plurality of utility service profiles associated with a plurality of homes in an area, and the plurality of utility service profiles comprises information associated with a plurality of utility services available at the plurality of homes. The operations may also include identifying a first group of the plurality of homes based on sensor data received from a plurality of sensors, and each of the first group of the plurality of homes has an outage of at least a first utility of the plurality of utility services during a period of time. The operations may also include identifying a second group of the plurality of homes based on the sensor data, and each of the second group of the plurality of homes has at least a second utility of the plurality of utility services available during the period of time, wherein the first utility is different from the second utility. The operations may also include sending a notification to a computing device associated with a first home of the second group, and the notification comprises a request to provide the second utility. The operations may also include receiving an acceptance from the computing device, and the acceptance comprises location data associated with the first home. The operations may also include sending an indication of the second utility being available to an additional computing device associated with a second home of the first group of the plurality of homes. The operations may also include receiving an additional acceptance to receive the second utility from the additional computing device, and, in response to receiving the additional acceptance from the additional computing device, sending access data for accessing the second utility to the additional computing device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
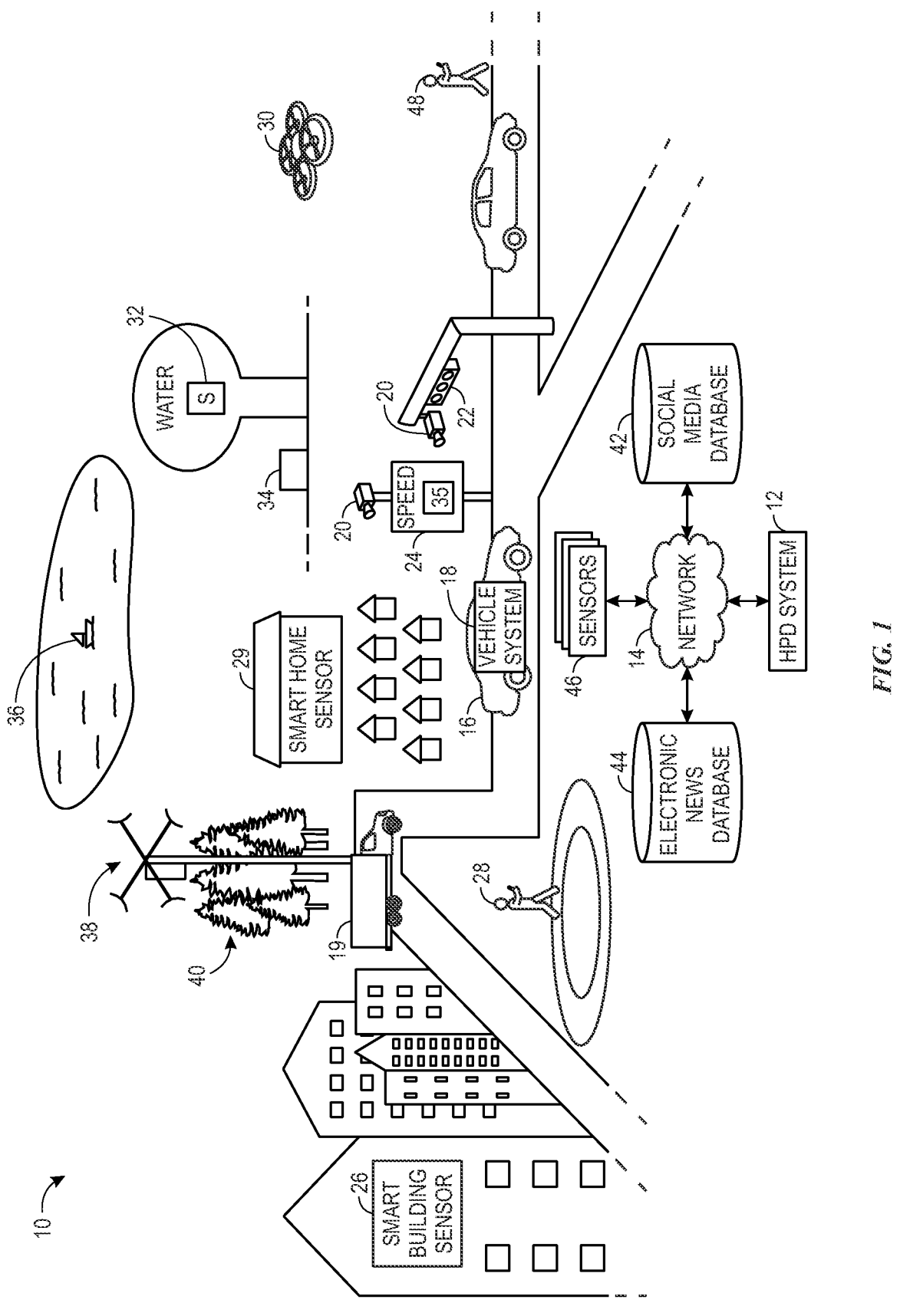
FIG. 1 is a diagram of a system including a variety of data sources that may be provided to a home power delivery system to perform analysis, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

As discussed above, power outages may result in unexpected issues, however, alternative power resources or power recovery may not be efficiently distributed to reconnect power to the areas that lost power. As such, it may be beneficial to provide systems and methods for efficient power delivery services.

With this in mind, the embodiments described herein may include systems and methods for using a home power delivery (HPD) system to provide power delivery service to locations experiencing power outages. That is, the HPD system may detect a power outage in an area and broadcast a request for power delivery service to vehicles, which may provide power delivery service to the area. For example, the vehicles may provide power generated by engines of the vehicles, by using a generator or a rechargeable battery carried by the vehicles, by a green energy (e.g., solar energy, wind energy) system equipped or carried on the vehicles, and the like. The HPD system may store (e.g., in a database) information of vehicles and corresponding power delivery options, such as location data of the vehicles, types of power provided (e.g., electricity, gas, solar energy, wind energy), and the like. The HPD system may broadcast the request to vehicles based on the location data of the vehicles relative the location of the home associated with the HPD system to expedite the power delivery. After receiving the broadcast, one or more vehicle systems may provide responses to indicate that vehicles are available to provide power to respond to the requests. The HPD system may receive the acceptances of power delivery requests and rank the acceptances based on location data of the vehicles, users of the vehicles, and the like. The HPD system may generate a list of power delivery options based on the ranking of the acceptances. The HPD system may then send the list of power delivery options to a device of an individual requesting the power delivery. The HPD system may receive a selection of one or more power delivery options from the user device. For example, the user may select power delivery options based on types of power provided by the power delivery, cost of the power delivery, available time and time durations of the power delivery, and the like.

The HPD system may also receive address data from the user. The HPD system may send the address data to corresponding vehicle systems of the selected vehicles. In some embodiments, some vehicle systems may receive the address data and automatically update the global positioning system (GPS) for the vehicle system to direct the driver of the vehicle to the address. In some embodiments, the vehicle system may automatically (e.g., autonomously) drive the vehicle to address. In some embodiments, vehicles or power storage units (e.g., battery) may be delivered to certain locations via a time-based train or truck and then driven to the user addresses. For example, a train or a truck may be used to deliver vehicles to locations that need power (e.g., a healthcare provider, a community, a city). The HPD system may schedule the delivery of the vehicles to the certain locations, e.g., based on user addresses, scheduled power delivery time, or priority of the power delivery services, and the like. After reaching the address, the vehicles may provide power generated by engines of the vehicles, a generator, a rechargeable battery carried by the vehicles, a green energy (e.g., solar energy, wind energy) system equipped or carried on the vehicles, or the like to the requested location. In some embodiments, the vehicles may be driven to a fuel refill station (e.g., gas station) or recharge station (e.g., electrical charging station) multiple times to refill the fuel for the engines or recharge the batteries to continue providing power to the users.

After the HPD system receives a confirmation of the acceptance of the power delivery vehicles from corresponding user devices, the HPD system may receive payment account information from the users, such as an account number, an indication of a digital wallet or ledger, or other suitable account data to facilitate payments for the power delivery service. In some embodiments, the payments may be facilitated via a smart contract stored on a blockchain. The HPD system may initiate the payment for the power delivery service using a payment method (e.g., a wire transfer, a smart contract) agreed by the user.

In some embodiments, the HPD system may utilize machine-learning algorithms or other identifying techniques to predict power delivery options for a user based on data collected from variety of data sources. For example, the HPD system may predict the period of power outages and recommend power delivery options based on weather forecast data, news, or social event data. For example, during severe weather, the power generated by a green energy (e.g., solar energy, wind energy) system may be limited. As such, the HPD system may send updated recommendations of power delivery options to the user based on the available power sources.

In addition, in some embodiments, resources in different homes of a community may not experience the same outage. For example, some homes in a community may experience a power outage while other homes may have power available. In addition, homes in a community may experience outages of different resources. For example, some homes may experience an electricity outage but may have gas, while other homes may experience an outage of gas but may have electricity. Accordingly, the HPD system may provide a resources exchange platform to allow resources to be exchanged among the neighborhood to allow for a distribution of the available resources across residents.

With this in mind, the HPD system may receive utility service profiles for homes in an area. Each of the utility service profiles may include information of utility services, such as gas, electricity, green energy, water, internet, and the like. The utility service profiles may also include location data of homes, information of utility service providers, and usage of utilities (e.g., average usage in a time period, peak usages and corresponding time, regular schedule of usage) in the homes. The HPD system may store (e.g., in a database) the utility service profiles and update the utility service profiles when there are changes.

The HPD system may then receive indications of one or more utility outages in the area. For example, the HPD system may receive signals from sensors indicating utility availabilities in homes in the area. The HPD system may identify a first group of homes associated with the one or more utility outages. The HPD system may also identify a second group of homes having at least one utility available. The HPD system may send a request to computing devices associated with the homes in the second group to solicit for providing utility services with available utilities. The HPD system may receive one or more acceptances to the request from the computing devices associated with the homes in the second group.

The HPD system may send a list of available utilities to computing devices associated with the homes in the first group. The HPD system may receive a selection from the list of available utilities from a first computing device associated with a home in the first group. The HPD system may send a request asking for utility access to a second computing device associated with the selection on the list of the available utilities. The HPD system may receive an approval from the second computing device for the utility access. The HPD system may also receive smart control access data from the second computing device for the utility access. For example, the smart control access data may include time and location of the access to the available utility, a passcode to the access, or other instructions to access to the available utility. The HPD system may send the smart control access data to the first computing device. The HPD system may also receive payment account information from the first computing device, such as an account number, an indication of a block in a blockchain, or other suitable account data to facilitate payments for the access to the utility to the home in the second group. In some embodiments, the payments may be facilitated via a smart contract stored on a blockchain.

In some embodiments, the HPD system may utilize machine-learning algorithms or other identifying techniques to identify a selection from the list of available utilities for a home in the first group based on the utility service profiles. For example, the HPD system may identify a home in the second group having a utility suitable (e.g., type of the utility, usage of the utility, location of the utility, available time of the utility) for the home in the first group based on the utility service profiles. The HPD system may send recommendations of selections to the home in the first group. Additional details with regard to providing power delivery service and energy exchange platform will be discussed below with reference to FIGS. 1-4.

By way of introduction, FIG. 1 illustrates a diagram of a system (e.g., a smart city) 10 that includes a variety of data sources to assist an HPD system 12, according to an embodiment of the present disclosure. Referring to FIG. 1, the system 10 may include a network 14 that may receive relevant data from the variety of data sources and transmit the data received from the data sources to the HPD system 12. The network 14 may receive data regarding operations, location, and other properties related to vehicles 16 via vehicle systems 18. For example, the vehicle system 18 may include speed data or location data, which the HPD system 12 may use to collect various types of data (e.g., temperature, occupancy, traffic) in the area at a given moment. In certain embodiments, the vehicle 16 may include a video system (e.g., image and audio sensors that collect image and audio data), which may capture real-time area data (e.g., vehicle traffic in the area, pedestrian traffic in the area, weather conditions) at a street level and send the captured data to the HPD system 12. In some embodiments, the video system may include an image sensor or any suitable camera to capture real-time image data. In some embodiments, the system 10 may include a truck/train 19 for delivering multiple vehicles 16 or other power storage/delivery devices to certain locations (e.g., a health provider, a community), and the HPD system 12 may schedule the delivery of the truck/train 19 based on various types of data (e.g., locations, traffic, scheduled delivery time, priority of delivery) collected.

The system 10 may also include the cameras 20 that may be affixed to a traffic light 22 or a speed detector 24. The traffic light 22 (or traffic sign, or dedicated data collection device like a traffic collection tower) and the speed detector 24 may send collected data to the HPD system 12 via the network 14 or any other suitable communication protocol. For example, the traffic light 22 may send data regarding the number of vehicles 16 passing the traffic light 22. The traffic light 22 may also receive commands (e.g., from the HPD system 12) causing the traffic light 22 to turn red, yellow, green, flash yellow, flash red, and so on.

The speed detector 24 may send data to the HPD system 12 regarding the posted speed limit in the area, and the speed detector 24 may receive commands (e.g., from the HPD system 12) causing the speed detector 24 to dynamically change the posted speed limit of the area (e.g., to slow the traffic in the area to facilitate an emergency response). While traffic lights are discussed, it should be noted that any controllable assets (e.g., electronic buoys, or other markers or indicators that may be disposed within or alongside a waterway, air traffic control lights, and so on) may be employed in the embodiments described herein.

The HPD system 12 may collect, via the network 14, data from building sensors 26. The building sensors 26 may be coupled to structures (e.g., buildings, bridges, roads, and so on). The building sensors 26 may include utility detecting sensors (e.g., gas sensors, electrical meters, flow meters, intelligent electronic devices, beacons, Ethernet detectors), motion sensors, sound sensors, vibration sensors, seismometers, a seismograph (e.g., to detect and record seismic events, volcanic activity, explosions, collisions, falling objects, etc.), water level sensors, humidity sensors, heat sensors, infrared sensors, or any other appropriate sensor that may provide information related to the ambient environment within or outside a building. For example, a gas sensor may be used to detect gas availability, an electrical meter may be used to detect electricity availability, a flow meter may be used to detect water/liquid flow speed, and an Ethernet detector may be used to detect internet availability and speed, while heat sensors and/or infrared sensors may assist in locating a fire, determining where the fire may have originated, determining in which direction the fire is traveling, and so on.

The HPD system 12 may also collect data from and/or about individuals in the area. For example, the individuals may be wearing wearable devices 28 that may include medical, biometric and/or location tracking devices. The HPD system 12 may track the location and health of the individuals via the wearable devices 28, which may provide information related to the presence of individuals in various locations.

Additionally, the HPD system 12 may receive data from smart home sensors 29. The smart home sensors 29 may include devices that may be positioned in a home or building and may be connected to a network. The smart home sensors 29 may include contact sensors that detect a position of door or other physical component, motion sensors that track movement of objects, vibration sensors, sound sensors that detect noise, water sensors that detect the presence of water or liquid in a location, temperature/humidity sensors, light (e.g., ultraviolet, infrared) sensors, smoke/carbon dioxide/gas sensors, electricity usage sensors, and the like. The smart home sensors 29 may also include devices that perform certain home automation operations. The devices may include smart plug-in devices that control the flow of electricity to connected devices, smart doorbells that track movement outside of the home and doorbell usages, security cameras that record objects present in its view under various conditions, smart thermostats that may control the heating and air conditioning systems, smart appliances (e.g., refrigerator, vacuum cleaner) that perform specific operations, smart assistant devices that respond to audio commands, listen to ambient noises that may be present, and control operations of connected devices, smart light fixtures, smart plumbing devices, and the like.

In addition to the devices described above, in some embodiments, drones 30 (e.g., unmanned aerial vehicles) may be employed to collect traffic data, image data, and the like. The drones 30 may be ground-based drones that traverse roads and different terrains via the air or surface to collect various types of data. In some situations, the drones may be waterborne. Other drones might traverse fluid pipes, gas pipes, drainage pipes, chimneys, caves, service tunnels, crawl spaces, attics, basements, parking garages, subways, etc. In this way, the drones may be positioned in the area and provide data to the HPD system 12 or other suitable device to perform the embodiments described herein.

The system 10 may also include a water tower sensor 32 that may detect water level in a water tower that provides clean water to residents of a city or area. The water tower sensor 32 be communicatively coupled to a water pump 34 that may pump water to various destination ports or from the water tower.

A smart buoy 36 may provide information related to a body of water, such as reservoir, river, lake, drainage area, or the like. The smart buoy 36 may detect a water level, wind speed, water temperature, water acidity level, and other properties related to a body of water.

In some embodiments, a wind sensor 38 may detect a wind speed, air quality properties (e.g., carbon monoxide, acid gases, smoke properties), and the like. One or more wind sensors 38 may be positioned at various locations within the system 10. The HPD system 12 may predict wind power that may be generated at various locations based on the data from the wind sensors 38. In some cases, the wind sensor 38 may be positioned in a forest area 40 or other wooded area to track wind patterns. Based on the measurements from the wind sensor 38 in the forest area 40, the HPD system 12 may track or predict paths for forest fires or other nuisances that may be influenced by the wind. The HPD system 12 may predict a location for efficiently collecting wind power.

As mentioned above, the HPD system 12 may be communicatively coupled to the sensors and devices described above via the network 14 or some suitable communication protocol. In addition, relevant data may also be gathered from social media database 42. Using web crawlers or other web monitoring tools, the HPD system 12 may track or receive information related to area data (e.g., regarding traffic), event data (e.g., text-based social media posts, pictures, videos of weather events, seismic events, conflagrations), or emergency resource data (e.g., text-based social media posts, pictures, videos of emergency responders). The social media database 42 may include data available via social media sites such as Facebook®, Twitter®, and the like. In one embodiment, the social media database 42 may include information associated with the individuals, businesses, organizations, governmental agencies, news outlets, and the like. For example, the data of the social media database 42 may be associated with the location of a user or a destination of the user. The social media database 42 may also include data trending on social media sites that may not be directly associated with any particular measurement described above. However, the trending data may provide the HPD system 12 additional data that may be related to the data collected from the sources described above. For instance, the data from the social media database 42 may include information regarding a natural phenomenon or any disruptive situation and may be correlated or verified with data acquired from the sensors or devices mentioned above or other suitable devices and sensors.

Additionally, the system 10 may include an electronic news database 44, which may include information provided by various news services that may be updated in real-time or near real time via a network (e.g., Internet). The electronic news database 44 may provide information regarding weather alerts, natural phenomenon alerts, non-natural phenomenon alerts (e.g., traffic, active shooter), and any other information that may be published via an electronic news outlet such as a webpage, news database, or the like. As such, the HPD system 12 may become aware of the likelihood of a disruptive event affecting a certain area.

In addition to the data sources mentioned above, the HPD system 12 may collect data from a wide variety of sensors 46. The sensors 46 may include any type of device (e.g., electrical sensors, temperature sensors, motion sensors, sound sensors, location sensors, image sensors, radio-frequency identification (RFID) sensors, beacons) capable of detecting utility (e.g., gas, electricity, water, internet), location, moisture, temperature, light, and the like. One or more sensors 46 may be disposed on different types of property such as an individual, a home, a vehicle, and the like. In certain embodiments, one or more sensors 46 may be disposed within certain rooms of the home, outside the home, within the vehicle, or outside the vehicle. The sensors 46 may also be disposed on devices carried by or worn by individuals. For example, the sensors 46 may be disposed on mobile phones, wearable electronics, and the like. In one embodiment, the sensors 46 may provide location information regarding the sensors 46. As such, the sensors 46 may provide global positioning system (GPS) coordinates and the like to indicate a location of the sensors 46. The HPD system 12 may predict solar power that may be generated at various locations based on the data from the sensors 46. The HPD system 12 may predict a location for efficiently collecting solar power.

In addition, the HPD system 12 may acquire additional data from smart mobile devices 48 of individuals. The smart mobile devices 48 may include any suitable device that may communicate data with the network 14. As such, the smart mobile device 48 may include smart phones, smart watches, network-enabled tablet devices, and the like. The smart mobile devices 48 may include location services that track a location of the respective device. In addition, the smart mobile devices 48 may send datasets, commands, and other signals to other devices. The HPD system 12 may communicate with corresponding individuals via the smart mobile devices 48. For example, the HPD system may send power delivery options or resources exchanging options to the smart mobile devices 48, and the HPD system may receive from the smart mobile devices 48 the selections of power delivery options or resources exchanging options, address data, smart control access data, payment account information, and the like.

Figure 2:
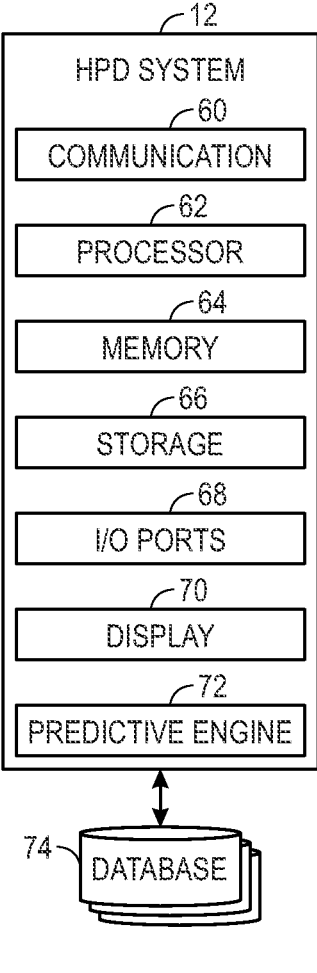
FIG. 2 is a block diagram of example components within the home power delivery system, in accordance with aspects of the present disclosure.

The HPD system 12 may use the collected data to provide home energy delivery or resources exchanging service in accordance with the embodiments presented herein. FIG. 2 is a block diagram of example components that may be part of the HPD system 12, according to an embodiment of the present disclosure. Although the following description details some example components that make up the HPD system 12, it should be understood that the HPD system 12 may include additional or fewer components.

Referring now to FIG. 2, the HPD system 12 may include a communication component 60, a processor 62, a memory 64, a storage 66, input/output (I/O) ports 68, a display 70, a predictive engine 72, a database 74 and the like. The communication component 60 may be a wireless or wired communication component that may facilitate communication between the HPD system 12, various types of devices, the network 14, and the like. Additionally, the communication component 60 may facilitate data transfer to the HPD system 12, such that the HPD system 12 may receive data from the other components depicted in FIG. 1 and the like. The communication component 60 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 62 may include single-threaded processor(s), multi-threaded processor(s), or both. The processor 62 may process instructions stored in the memory 64. The processor 62 may also include hardware-based processor(s) each including one or more cores. The processor 62 may include general purpose processor(s), special purpose processor(s), or both. The processor 62 may be communicatively coupled to other internal components (such as the communication component 60, the storage 66, the I/O ports 68, and the display 70).

The memory 64 and the storage 66 may be any suitable articles of manufacture that can serve as media to store processor-executable code, data, or the like. These articles of manufacture may represent computer-readable media (e.g., any suitable form of memory or storage) that may store the processor-executable code used by the processor 62 to perform the presently disclosed techniques. As used herein, applications may include any suitable computer software or program that may be installed onto the HPD system 12 and executed by the processor 62. The memory 64 and the storage 66 may represent non-transitory computer-readable media (e.g., any suitable form of memory or storage) that may store the processor-executable code used by the processor 62 to perform various techniques described herein. It should be noted that non-transitory merely indicates that the media is tangible and not a signal.

The I/O ports 68 may be interfaces that may couple to other peripheral components such as input devices (e.g., keyboard, mouse), sensors, input/output (I/O) modules, and the like. The display 70 may operate as a human machine interface (HMI) to depict visualizations associated with software or executable code being processed by the processor 62. The display 70 may operate to depict a representation of the three-dimensional (3D) augmented reality (AR) or virtual reality (VR) visualizations associated with software or executable code being processed by the processor 62. In one embodiment, the display 70 may be a touch display capable of receiving inputs from an operator of the HPD system 12. The display 70 may be any suitable type of display, such as a liquid crystal display (LCD), plasma display, or an organic light emitting diode (OLED) display, for example. Additionally, in one embodiment, the display 70 may be provided in conjunction with a touch-sensitive mechanism (e.g., a touch screen) that may function as part of a control interface for the HPD system 12.

The predictive engine 72 may utilize one or more predictive models for analysis of the variety of data received by the HPD system 12. Various types of predictive models may be used to analyze data from variety of resources and generate predictive outputs. For example, the predictive engine 72 may be trained with supervised machine learning technique, i.e., a predictive model is trained with training data that includes input data and desired predictive output (e.g., labeled dataset). The predictive engine 72 may also be trained with unsupervised machine learning technique, i.e., a predictive model is trained with training data that includes input data but without desired predictive output (e.g., unlabeled dataset). The HPD system 12 may also communicate with a database 74, which may store information associated with the system 10.

It should be noted that the components described above with regard to the HPD system 12 are exemplary components and the HPD system 12 may include additional or fewer components as shown. In addition, although the components are described as being part of the HPD system 12, the components may also be part of any suitable computing device described herein such as the vehicle system 18, the speed detector (e.g., speedometer) 24, the traffic light 22, the sensors 46, and the like to perform the various operations described herein.

Figure 3:
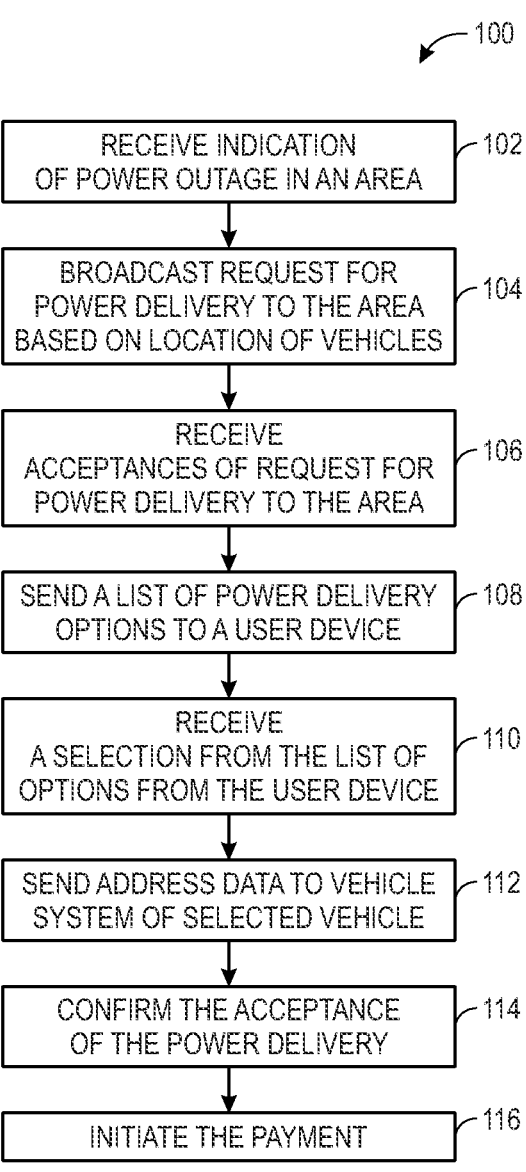
FIG. 3 is a flowchart of a method for providing home power delivery service using the home power delivery system of FIG. 1, in accordance with aspects of the present disclosure.

Keeping this in mind, FIG. 3 is a flowchart of a method 100 for using the HPD system 12 to provide power delivery service. Although the following description of the method 100 is described as being performed by the HPD system 12 and in a particular order, it should be understood that any suitable device may perform the method 100 in any suitable order.

Referring now to FIG. 3, at block 102, the HPD system 12 may receive indication of power outage in an area (e.g., the smart city in FIG. 1). In some embodiments, the HPD system 12 may detect a power outage in an area by using sensors. For example, the HPD system 12 may receive signals from sensors (e.g., smart building sensor 26, smart home sensor 29) indicating utility availabilities in the area. In other embodiments, power monitoring systems may provide data related to power consumption in any particular area. If the power consumption data indicates that there is an abrupt (e.g., with some threshold amount of time) decrease in power consumption, the HPD system 12 may determine that there is a power outage.

At block 104, the HPD system 12 may broadcast a request for power delivery service to vehicle systems of vehicles, which may provide power delivery service to the area. For example, the vehicles may provide power generated by engines of the vehicles, by using a generator or a rechargeable battery carried by the vehicles, by a green energy (e.g., solar energy, wind energy) system equipped or carried on the vehicles, and the like. The HPD system 12 may store (e.g., in a database) information of vehicles and corresponding power delivery options, such as location data of the vehicles, types of power provided (e.g., electricity, gas, solar energy, wind energy), and the like. The HPD system 12 may broadcast the request to vehicle systems based on the location data of the vehicles relative the location of a home associated with the detected power outage.

At block 106, the HPD system 12 may receive the acceptances of power delivery requests from one or more users via one or more vehicle systems. The HPD system 12 may, in some embodiments, rank the acceptances based on location data of the vehicles, ratings associated with users of the vehicles, and the like. For example, one or more vehicle systems may provide responses to the broadcast to indicate that users of the vehicles are available and willing to provide power to a consumer.

At block 108, the HPD system 12 may generate a list of power delivery options based on the ranking of the acceptances. The power delivery options may be ranked based on distance between the vehicle and the home associated with the power outage, a rating of the respective user, a type of energy provided by the vehicle, and the like. The HPD system 12 may then send the list of power delivery options to a user device (e.g., wearable devices 28, mobile devices 48) of an individual requesting the power delivery.

At block 110, the HPD system 12 may receive a selection of one or more power delivery options from the user device. For example, the user may select power delivery options based on types of power provided by the power delivery, cost of the power delivery, available time and time durations of the power delivery, and the like. The HPD system 12 may also receive address data from the user device along with the selection. The address data may be provided based on a user profile associated with the user device, location sensor data acquired by the user device, and the like. In some embodiments, the HPD system 12 may utilize machine-learning algorithms or other identifying techniques to predict times in which power delivery options may be requested by a user based on data collected from variety of data sources (e.g., the media database 42, the electronic news database 44, the sensors 46). For example, the HPD system 12 may filter or rank the power delivery options based on weather forecast data, news, or social event data. That is, during a weather event where power is expected to be lost (e.g., based on historical models, machine learning), the HPD system 12 may determine that the power generated by a green energy (e.g., solar energy, wind energy) system may be limited. As such, the HPD system 12 may send updated recommendations of power delivery options to the user based on the available or more efficient power sources.

At block 112, the HPD system 12 may send the address data to corresponding vehicle systems of the selected vehicles (e.g., the vehicle 16). In some embodiments, some vehicle systems may receive the address data and automatically update the global positioning system (GPS) for the vehicle system (e.g., the vehicle system 18) to direct the driver of the vehicle to the address. In some embodiments, the vehicle system may automatically (e.g., autonomously) drive the vehicle to address. In some embodiments, vehicles or power storage units (e.g., battery) may be delivered to certain locations via a time-based train or truck and then driven to the user addresses. For example, a train or a truck (e.g., the truck/train 19) may be used to deliver vehicles to locations that need power (e.g., a healthcare provider, a community, a city). The HPD system 12 may manage and schedule the delivery of the vehicles to the certain locations, e.g., based on user addresses, traffic on the way to the addresses, scheduled power delivery time, or priority of the power delivery services, and the like. For instance, the HPD system 12 may collect various types of data (e.g., weather, news, traffic) from the media database 42, the electronic news database 44, the sensors 46, the cameras 20, vehicle system 18 of the vehicle 16, and the like. For example, the vehicle 16 may include a video system (e.g., image and audio sensors that collect image and audio data), which may capture real-time area data (e.g., vehicle traffic in the area, pedestrian traffic in the area, weather conditions) at a street level. The HPD system 12 may also schedule the delivery of the truck/train 19 based on the various types of data collected.

After reaching the address, the vehicles may provide power generated by engines of the vehicles, a generator, a rechargeable battery carried by the vehicles, a green energy (e.g., solar energy, wind energy) system equipped or carried on the vehicles, or the like to the requested location. In some embodiments, the vehicles may be driven to a fuel refill station (e.g., gas station) or recharge station (e.g., electrical charging station) multiple times to refill the fuel for the engines or recharge the batteries to continue providing power to the users. In some embodiments, the HPD system 12 may monitor the weather and predict a location for efficiently collecting green energy (e.g., solar energy, wind energy). For example, the HPD system 12 may predict a location for efficiently collecting solar power by using data received from the sensors 46. The HPD system 12 may also predict wind power that may be generated at various locations based on the data from the wind sensors 38.

At block 114, the HPD system 12 may receive a confirmation of the acceptance of the power delivery vehicles from corresponding user devices (e.g., wearable devices 28, mobile devices 48). The HPD system 12 may also receive payment account information from the users, such as an account number, an indication of a digital wallet or ledger, or other suitable account data to facilitate payments for the power delivery service. In some embodiments, the payments may be facilitated via a smart contract stored on a blockchain. At block 116, the HPD system 12 may initiate the payment for the power delivery service using a payment method (e.g., a wire transfer, a smart contract) agreed by the user.

As mentioned previously, in some embodiments, resources in different homes of a community may not experience the same outage. For example, some homes in a community may experience a power outage while other homes may have power available. In addition, homes in a community may experience outages of different resources. For example, some homes may experience an electricity outage but may have gas, while other homes may experience an outage of gas but may have electricity. The HPD system 12 may provide a resources exchange platform to allow resources to be exchanged among the neighborhood to allow for a distribution of the available resources across residents.

Figure 4:
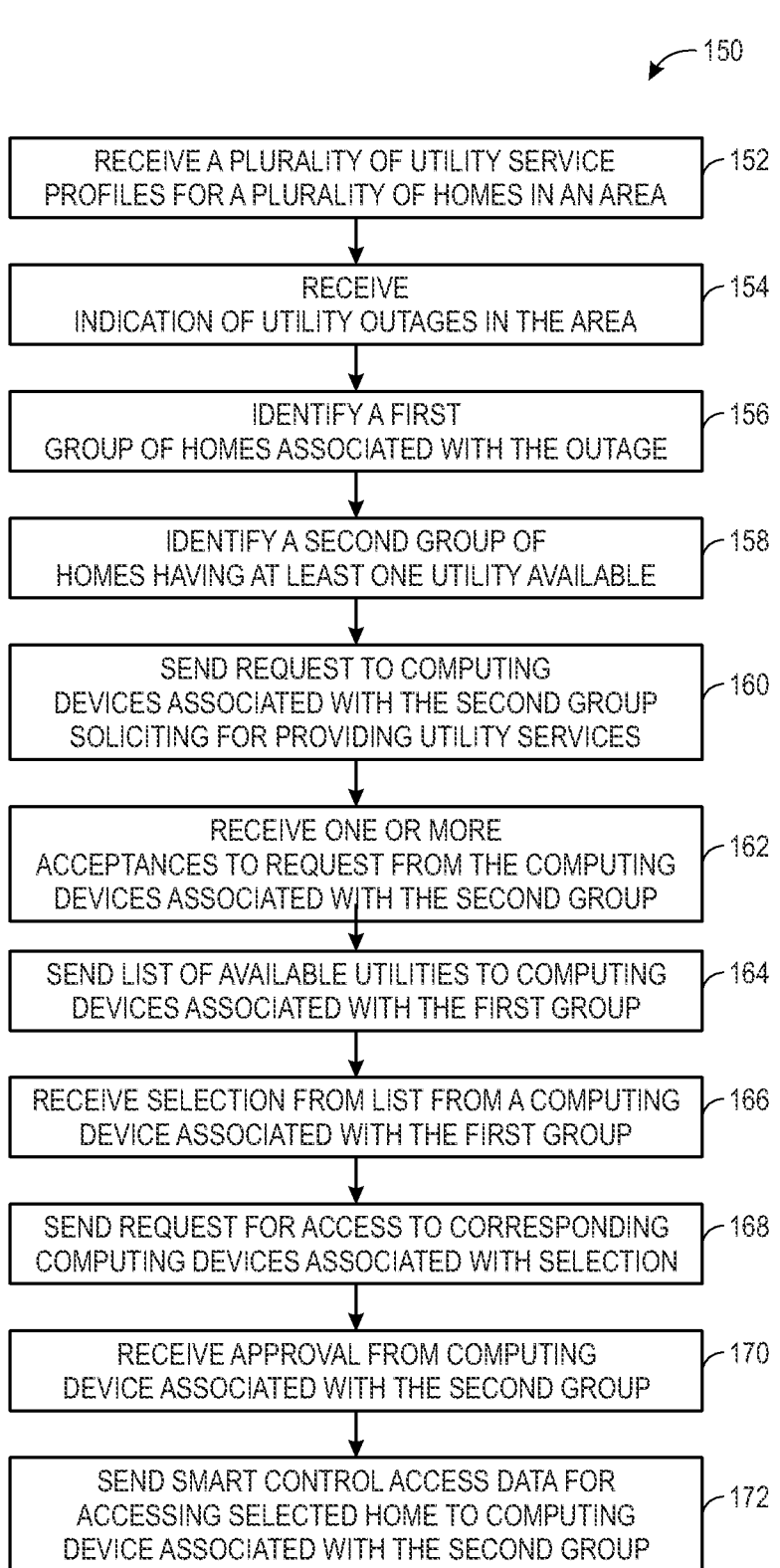
FIG. 4 is a flowchart of a method for exchanging resources using the home power delivery system of FIG. 1, in accordance with aspects of the present disclosure.

With this in mind, FIG. 4 shows a flowchart of a method 150 for using the HPD system 12 to provide resource exchange in an area (e.g., the smart city in FIG. 1). Although the following description of the method 150 is described as being performed by the HPD system 12 and in a particular order, it should be understood that any suitable device may perform the method 150 in any suitable order.

At block 152, the HPD system 12 may receive utility service profiles for homes in the area. Each of the utility service profiles may include information of utility services, such as gas, electricity, green energy, water, internet, and the like. The utility service profiles may also include location data of homes, information of utility service providers, and usage of utilities (e.g., average usage in a time period, peak usages and corresponding time, regular schedule of usage) in the homes. The HPD system 12 may store (e.g., in a database) the utility service profiles and update the utility service profiles when there are changes.

At block 154, the HPD system 12 may receive indications of one or more utility outages (e.g., electricity, gas) in the area from variety of data sources. For example, the HPD system 12 may receive signals from sensors (e.g., the smart building sensor 26, the smart home sensor 29, the sensors 46) or information from databases (e.g., social media database 42, electronic news database 44) indicating utility availabilities in homes in the area. Based on the signals received from the sensors, at block 156, the HPD system 12 may identify a first group of homes associated with the one or more utility outages.

At block 158, the HPD system 12 may also identify a second group of homes having at least one utility available (e.g., electricity, gas) based on the signals received from the sensors. At block 160, the HPD system 12 may send a request to computing devices associated with the homes in the second group to solicit for providing utility services with available utilities. At block 162, the HPD system 12 may receive one or more acceptances to the request from the computing devices associated with the homes in the second group. In some embodiments, the HPD system may receive corresponding utility access information (e.g., location of the home) with the acceptances. At block 164, the HPD system 12 may send a list of available utilities to computing devices associated with the homes in the first group. In some embodiments, the HPD system 12 may utilize machine-learning algorithms or other identifying techniques to identify a selection from the list of available utilities for a home in the first group based on the utility service profiles. For example, the HPD system 12 may identify a home in the second group having a utility suitable (e.g., type of the utility, usage of the utility, location of the utility, available time of the utility) for the home in the first group based on the utility service profiles. The HPD system 12 may send recommendations of selections to the home in the first group.

At block 166, the HPD system 12 may receive a selection from the list of available utilities from a computing device associated with a home in the first group. At block 168, the HPD system 12 may send a request asking for utility access to a computing device associated with the selection on the list of the available utilities. The HPD system 12 may receive an approval from the computing device associated with the selection for the utility access at block 170. The HPD system 12 may also receive smart control access data from the computing device associated with the selection for the utility access. For example, the smart control access data may include time and location of the access to the available utility, a passcode to the access, or other instructions to access to the available utility. For example, the home may include smart plug-in devices that control the flow of electricity to connected devices.

At block 172, the HPD system may send the smart control access data to the computing device associated with the home in the first group. The HPD system may also receive payment account information from the computing device associated with the home in the first group, such as an account number, an indication of a block in a blockchain, or other suitable account data to facilitate payments for the access to the utility to the home in the second group. In some embodiments, the payments may be facilitated via a smart contract stored on a blockchain.

While only certain features of the embodiments described herein have been illustrated and described herein, many modifications and changes will occur to those skilled in the art. It is, therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a plurality of sensors; and
a computing system, comprising a processor configured to:
  receive a plurality of utility service profiles associated a plurality of homes in an area, wherein the plurality of utility service profiles comprises information associated with a plurality of utility services available at the plurality of homes, wherein the plurality of sensors is configured to monitor one or more statuses of the plurality of utility services;
  generate, via the plurality of sensors, sensor data indicating the one or more statuses of the plurality of utility services;
  detect, via the plurality of sensors, one or more outages of one or more utility services of the plurality of utility services at the plurality of homes;
  in response to detecting the one or more outages, identify a first group of the plurality of homes based on the sensor data received from the plurality of sensors, wherein each of the first group of the plurality of homes has an outage of at least a first utility of the plurality of utility services during a period of time;
  identify a second group of the plurality of homes based on the sensor data, wherein each of the second group of the plurality of homes has at least a second utility of the plurality of utility services available during the period of time, wherein the first utility is different from the second utility;

send a notification to a computing device associated with a first home of the second group, wherein the notification comprises a request to provide the second utility;
  receive an acceptance from the computing device, wherein the acceptance comprises location data associated with the first home;
  send an indication of the second utility being available to an additional computing device associated with a second home of the first group of the plurality of homes;
  receive an additional acceptance to receive the second utility from the additional computing device; and
  in response to receiving the additional acceptance from the additional computing device, send access data for accessing the second utility to the additional computing device.

2. The system of claim 1, comprising one or more data sources providing data associated with weather, a social event, news, or any combination thereof, wherein the first group of the plurality of homes is identified based at least in part on the data.

3. The system of claim 1, wherein the plurality of sensors is configured to detect availability of electricity, gas, internet, or any combination thereof.

4. The system of claim 1, wherein the plurality of sensors comprises one or more electrical sensors, one or more temperature sensors, one or more motion sensors, one or more sound sensors, one or more location sensors, one or more image sensors, one or more radio-frequency identification (RFID) sensors, one or more beacons, or any combination thereof.

5. The system of claim 1, wherein at least one of the plurality of sensors is part of a mobile device.

6. The system of claim 1, wherein at least one of the plurality of sensors is part of a wearable device.

7. The system of claim 1, wherein the plurality of sensors comprises a smart plug-in device that is configured to control a flow of electricity.

8. The system of claim 7, wherein the smart plug-in device is configured to operate based on the access data.

9. The system of claim 1, wherein the access data comprises a time and a location for accessing to the second utility.

10. A method comprising,
receiving, via one or more processors, a plurality of utility service profiles associated a plurality of homes in an area, wherein the plurality of utility service profiles comprises information associated with a plurality of utility services available at the plurality of homes, wherein a plurality of sensors is configured to monitor one or more statuses of the plurality of utility services;
generating, via the plurality of sensors, sensor data indicating the one or more statuses of the plurality of utility services;
detecting, via the plurality of sensors, one or more outages of one or more utility services of the plurality of utility services at the plurality of homes;
in response to detecting the one or more outages, identifying, via the one or more processors, a first group of the plurality of homes based on the sensor data received from the plurality of sensors, wherein each of the first group of the plurality of homes has an outage of at least a first utility of the plurality of utility services during a period of time;
identifying, via the one or more processors, a second group of the plurality of homes based on the sensor data, wherein each of the second group of the plurality of homes has at least a second utility of the plurality of utility services available during the period of time, wherein the first utility is different from the second utility;

sending, via the one or more processors, a notification to a computing device associated with a first home of the second group, wherein the notification comprises a request to provide the second utility;

receiving, via the one or more processors, an acceptance from the computing device, wherein the acceptance comprises location data associated with the first home;

sending, via the one or more processors, an indication of the second utility being available to an additional computing device associated with a second home of the first group of the plurality of homes;

receiving, via the one or more processors, an additional acceptance to receive the second utility from the additional computing device; and in response to receiving the additional acceptance from the additional computing device, sending, via the one or more processors, access data for accessing the second utility to the additional computing device.

11. The method of claim 10, comprising:

receiving, from one or more sources, data associated with weather, a social event, news, or any combination thereof, wherein the first group of the plurality of homes is identified based at least in part on the data.

12. The method of claim 10, wherein the plurality of sensors is configured to detect availability of electricity, gas, internet, or any combination thereof.

13. The method of claim 10, wherein at least one of the plurality of sensors is part of a mobile device.

14. The method of claim 10, wherein at least one of the plurality of sensors is part of a wearable device.

15. The method of claim 10, wherein the plurality of sensors comprises a smart plug-in device that is configured to control a flow of electricity.

16. The method of claim 15, wherein the smart plug-in device is configured to operate based on the access data.

17. A non-transitory, computer readable medium comprising instructions that, when executed by a processor, cause the processor to perform operations comprising:

receiving a plurality of utility service profiles associated a plurality of homes in an area, wherein the plurality of utility service profiles comprises information associated with a plurality of utility services available at the plurality of homes, wherein a plurality of sensors is configured to monitor one or more statuses of the plurality of utility services;

generating, via the plurality of sensors, sensor data indicating the one or more statuses of the plurality of utility services;

detecting, via the plurality of sensors, outages of one or more utility services of the plurality of utility services at the plurality of homes;

in response to detecting the outages, identifying a first group of the plurality of homes based on the sensor data received from the plurality of sensors, wherein each of the first group of the plurality of homes has an outage of at least a first utility of the plurality of utility services during a period of time;

identifying a second group of the plurality of homes based on the sensor data, wherein each of the second group of the plurality of homes has at least a second utility of the plurality of utility services available during the period of time, wherein the first utility is different from the second utility;

sending a notification to a computing device associated with a first home of the second group, wherein the notification comprises a request to provide the second utility;

receiving an acceptance from the computing device, wherein the acceptance comprises location data associated with the first home;

sending an indication of the second utility being available to an additional computing device associated with a second home of the first group of the plurality of homes;

receiving an additional acceptance to receive the second utility from the additional computing device; and in response to receiving the additional acceptance from the additional computing device, sending access data for accessing the second utility to the additional computing device.

18. The non-transitory, computer readable medium of claim 17, wherein the operations comprise:

receiving, from one or more sources, data associated with weather, a social event, news, or any combination thereof, wherein the first group of the plurality of homes is identified based at least in part on the data.

19. The non-transitory, computer readable medium of claim 17, wherein the plurality of sensors comprises a smart plug-in device that is configured to control a flow of electricity.

20. The non-transitory, computer readable medium of claim 19, wherein the smart plug-in device is configured to operate based on the access data.

* * * * *